(12) United States Patent
Kim et al.

(10) Patent No.: US 10,610,075 B2
(45) Date of Patent: Apr. 7, 2020

(54) CLEANER HOLDER

(71) Applicant: LG ELECTRONICS INC., Seoul (KR)

(72) Inventors: Namhee Kim, Seoul (KR); Bohyun Nam, Seoul (KR); Jungbae Hwang, Seoul (KR); Jinju Kim, Seoul (KR); Sehwan Bae, Seoul (KR)

(73) Assignee: LG Electronics Inc., Seoul (KR)

(*) Notice: Subject to any disclaimer, the term of this patent is extended or adjusted under 35 U.S.C. 154(b) by 372 days.

(21) Appl. No.: 15/590,177

(22) Filed: May 9, 2017

(65) Prior Publication Data

US 2017/0319036 A1 Nov. 9, 2017

(30) Foreign Application Priority Data

May 9, 2016 (KR) .......................... 10-2016-0056462
Aug. 25, 2016 (KR) .......................... 10-2016-0108642

(51) Int. Cl.
*A47L 9/28* (2006.01)
*H01M 10/44* (2006.01)
(Continued)

(52) U.S. Cl.
CPC .................. *A47L 9/28* (2013.01); *A47L 5/28* (2013.01); *A47L 9/2884* (2013.01); *H01M 2/1066* (2013.01); *H01M 10/44* (2013.01); *H01M 10/46* (2013.01); *A47L 5/00* (2013.01); *A47L 9/00* (2013.01)

(58) Field of Classification Search
CPC ..... A47L 5/00; A47L 5/28; A47L 9/00; A47L 9/28; A47L 9/2884; H01M 10/44; H01M 10/46; H01M 2/1066
See application file for complete search history.

(56) References Cited

U.S. PATENT DOCUMENTS 5,926,909 A * 7/1999 McGee .................... A47L 5/24
15/339
9,155,431 B2 10/2015 Dyson et al.
(Continued)

FOREIGN PATENT DOCUMENTS

CN 105395132 3/2016
DE 102010038095 4/2012
(Continued)

OTHER PUBLICATIONS

JP-2014200379-A—English Machine Translation (Year: 2014).*
(Continued)

*Primary Examiner* — Marc Carlson
(74) *Attorney, Agent, or Firm* — Fish & Richardson P.C.

(57) ABSTRACT

A cleaner holder according to an embodiment includes: a charging stand body having at least one charging port for charging a battery of a cleaner, a support connected to the charging stand body; and a base supported on a floor and connected to the support, wherein the base includes: an inner base surrounding at least a portion of the support; an upper cover coupled to the inner base on an upper side of the inner base and configured to support an outer peripheral surface of the support; and a lower cover coupled to the inner base on a lower side of the inner base and configured to support an inner peripheral surface of the support.

23 Claims, 16 Drawing Sheets

(51) Int. Cl.
*A47L 5/28* (2006.01)
*A47L 9/00* (2006.01)
*A47L 5/00* (2006.01)
*H01M 2/10* (2006.01)
*H01M 10/46* (2006.01)

(56) References Cited

U.S. PATENT DOCUMENTS

| | | | |
|---|---|---|---|
| 2011/0219566 A1* | 9/2011 | Dyson | A47L 5/24 15/323 |
| 2011/0219571 A1* | 9/2011 | Dyson | A47L 5/24 15/344 |
| 2013/0328523 A1* | 12/2013 | Ota | H02J 7/0045 320/107 |
| 2015/0135470 A1* | 5/2015 | Mantyla | A47L 9/2873 15/301 |
| 2016/0051109 A1* | 2/2016 | Hwang | A47L 5/225 15/339 |
| 2016/0174787 A1* | 6/2016 | Conrad | A47L 5/24 15/329 |
| 2017/0319034 A1* | 11/2017 | Kim | A47L 5/28 |
| 2017/0319035 A1* | 11/2017 | Kim | A47L 5/28 |
| 2017/0319037 A1* | 11/2017 | Kim | A47L 5/225 |
| 2017/0319038 A1* | 11/2017 | Kim | A47L 5/28 |
| 2017/0319039 A1* | 11/2017 | Kim | A47L 9/2873 |
| 2018/0125314 A1 | 5/2018 | Kim et al. | |

FOREIGN PATENT DOCUMENTS

| | | | | |
|---|---|---|---|---|
| GB | 2441962 | | 3/2008 | |
| JP | S4965558 | | 6/1974 | |
| JP | S53157568 | | 12/1978 | |
| JP | S54074479 | | 5/1979 | |
| JP | S61164894 | | 10/1986 | |
| JP | S62290428 | | 12/1987 | |
| JP | 63143260 | | 9/1988 | |
| JP | H01209929 | | 8/1989 | |
| JP | 3015517 | | 9/1995 | |
| JP | H11205427 | | 7/1999 | |
| JP | 2001095168 | | 4/2001 | |
| JP | 2001149289 | | 6/2001 | |
| JP | 2001149289 A | * | 6/2001 | |
| JP | 2004121469 | | 4/2004 | |
| JP | 2004241342 | | 8/2004 | |
| JP | 2011189132 | | 9/2011 | |
| JP | 2014124443 | | 7/2014 | |
| JP | 2014200379 | | 10/2014 | |
| JP | 2014200379 A | * | 10/2014 | |
| JP | 2015012946 | | 1/2015 | |
| JP | 2015012946 A | * | 1/2015 | |
| JP | 2015119879 | | 7/2015 | |
| JP | 2015119879 A | * | 7/2015 | |
| JP | 2015134131 | | 7/2015 | |
| KR | 20-1998-0018401 | | 7/1998 | |
| KR | 200194997 | | 9/2000 | |
| KR | 200246448 | | 8/2001 | |
| KR | 10-2003-0041568 | | 5/2003 | |
| KR | 100614320 | | 8/2006 | |
| KR | 10-2012-0103956 | | 9/2012 | |
| KR | 10-2012-0103964 | | 9/2012 | |
| KR | 10-2016-0023134 | | 3/2016 | |
| WO | 2016114038 | | 7/2016 | |
| WO | WO-2016114038 A1 | * | 7/2016 | A47L 5/24 |
| WO | 2015129387 | | 3/2017 | |
| WO | 2017101542 | | 6/2017 | |
| WO | WO-2017101542 A1 | * | 6/2017 | A47L 5/24 |

OTHER PUBLICATIONS

WO-2017101542-A1—English Machine Translation (Year: 2017).*
International Search Report in International Application No. PCT/KR2017/004735, dated Aug. 9, 2017, 3 pages (with partial English translation).
International Search Report in International Application No. PCT/KR2017/004740, dated Jul. 27, 2017, 3 pages (with partial English translation).
International Search Report in International Application No. PCT/KR2017/004392, dated Aug. 7, 2017, 3 pages (with partial English translation).
International Search Report in International Application No. PCT/KR2017/004391, dated Jul. 28, 2017, 3 pages (with partial English translation).
International Search Report in International Application No. PCT/KR2017/004278, dated Jun. 29, 2017, 3 pages (with partial English translation).
International Search Report in International Application No. PCT/KR2017/004276, dated Jun. 29, 2017, 3 pages (with partial English translation).
International Search Report in International Application No. PCT/KR2017/004741, dated Jul. 28, 2017, 3 pages (with partial English translation).
EP Supplementary Search Report in European Application No. EP17796305, dated Jan. 7, 2020, 3 pages.

* cited by examiner

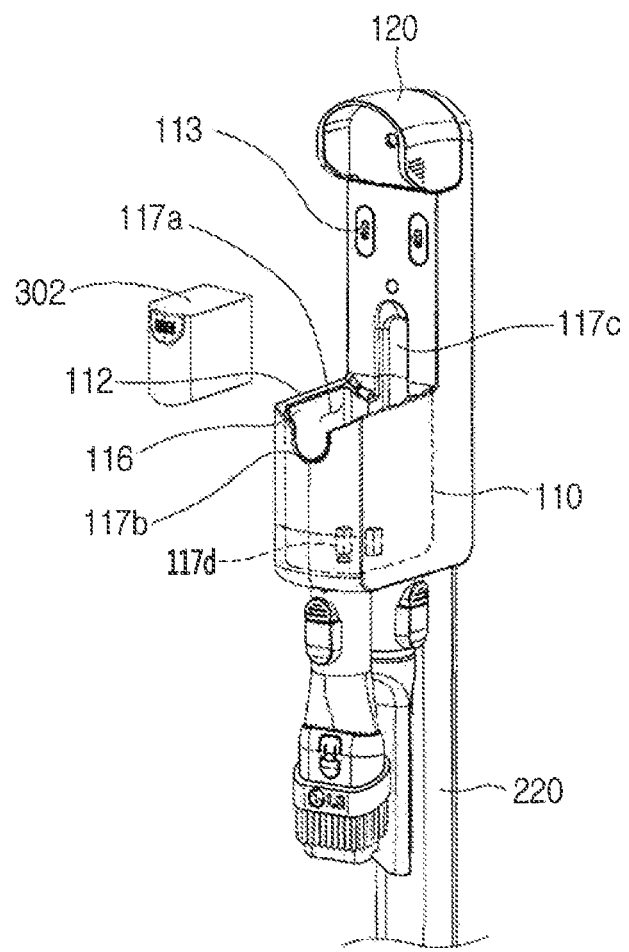

CLEANER HOLDER

CROSS-REFERENCE TO RELATED APPLICATIONS

This application claims priority under 35 U.S.C. § 119 to Korean Patent Application No. 10-2016-0056462, filed in Korea on May 9, 2016, and Korean Patent Application No. 10-2016-0108642, filed in Korea on Aug. 25, 2016, whose entire disclosure is hereby incorporated by reference.

BACKGROUND

The present disclosure relates to a cleaner holder.

A cleaner is a device that performs cleaning by sucking and wiping dust or foreign substances on a surface to be cleaned.

Such a cleaner may be classified into a manual cleaner that performs cleaning while a user directly moves the cleaner and an automatic cleaner that performs cleaning while the cleaner is driven by itself. The manual cleaner may be classified into a canister cleaner, an upright cleaner, a handheld cleaner, a stick cleaner and the like depending on types of the cleaner.

The above-described cleaner may have a rechargeable battery embedded therein, and the rechargeable battery may supply electric power for operating the cleaner only when being frequently charged. Thus, the cleaner requires a holder that may simultaneously charge the rechargeable battery and hold the cleaner.

Contents of a vacuum cleaner holder are disclosed in Korean Patent Application Publication No. 10-2012-0103956 as the prior art.

The vacuum cleaner holder according to the prior art includes a pedestal for holding a head of a vacuum cleaner to simultaneously charge and hold the vacuum cleaner and a support having charging pins for charging the vacuum cleaner.

Meanwhile, the vacuum cleaner holder according to the prior art, which holds a vacuum cleaner having a center on a lower side thereof, is inserted into support pieces on a lower side of the vacuum cleaner to support the vacuum cleaner. However, in case of a cleaner having a center on an upper side thereof, because a charging terminal should be provided on an upper side, the cleaner holder according to the prior art may not hold the cleaner.

SUMMARY

The present disclosure provides a cleaner holder that may simultaneously charge and stably hold a cleaner.

A cleaner holder includes: a charging stand body having at least one charging port configured to charge a battery of a cleaner; a support connected to the charging stand body; and a base supported on a floor and connected to the support.

The base includes: an inner base surrounding at least a portion of the support; an upper cover coupled to the inner base on an upper side of the inner base and configured to support an outer peripheral surface of the support; and a lower cover coupled to the inner base on a lower side of the inner base and configured to support an inner peripheral surface of the support.

BRIEF DESCRIPTION OF THE DRAWINGS

Embodiments will be described in detail with reference to the following drawings in which like reference numerals refer to like elements, and wherein:

FIG. 6 is a view illustrating a state in which an extra battery is separated from the cleaner holder;

DETAILED DESCRIPTION OF THE EMBODIMENTS

Figure 1:
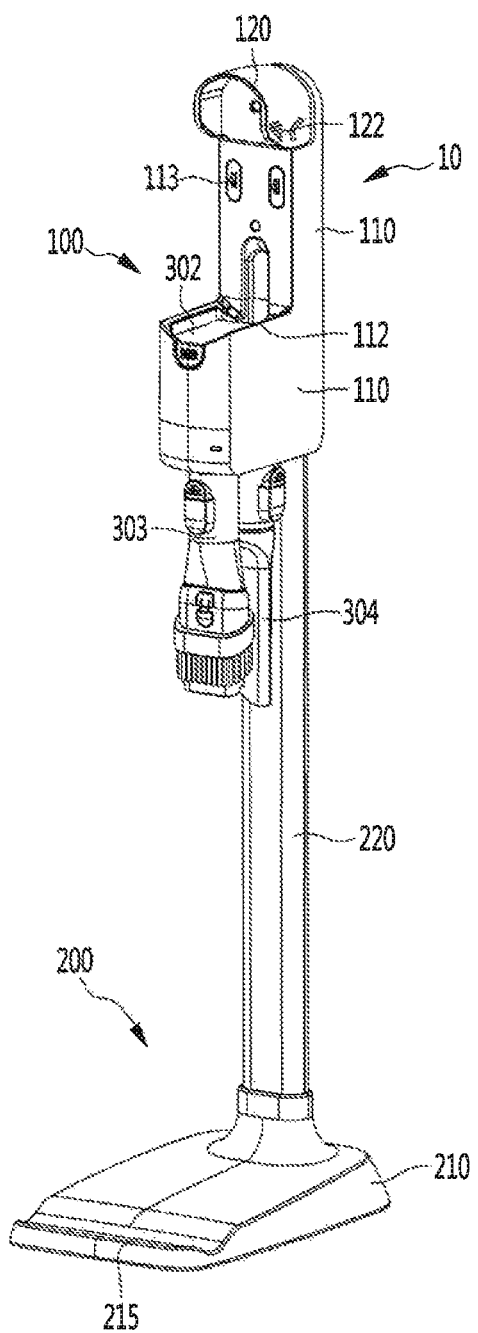
FIG. 1 is a perspective view illustrating a cleaner holder according to an embodiment of the present disclosure.

Hereinafter, some embodiments of the present disclosure will be described in detail with reference to the accompanying drawings. It should be noted that when components in the drawings are designated by reference numerals, the same components have the same reference numerals as far as possible even though the components are illustrated in different drawings. Further, in description of embodiments of the present disclosure, when it is determined that detailed descriptions of well-known configurations or functions disturb understanding of the embodiments of the present disclosure, the detailed descriptions will be omitted.

Also, in the description of the embodiments of the present disclosure, the terms such as first, second, A, B, (a) and (b) may be used. Each of the terms is merely used to distinguish the corresponding component from other components, and does not delimit an essence, an order or a sequence of the corresponding component. It should be understood that when one component is "connected", "coupled" or "joined" to another component, the former may be directly connected or jointed to the latter or may be "connected", coupled" or "joined" to the latter with a third component interposed therebetween.

Figure 2:
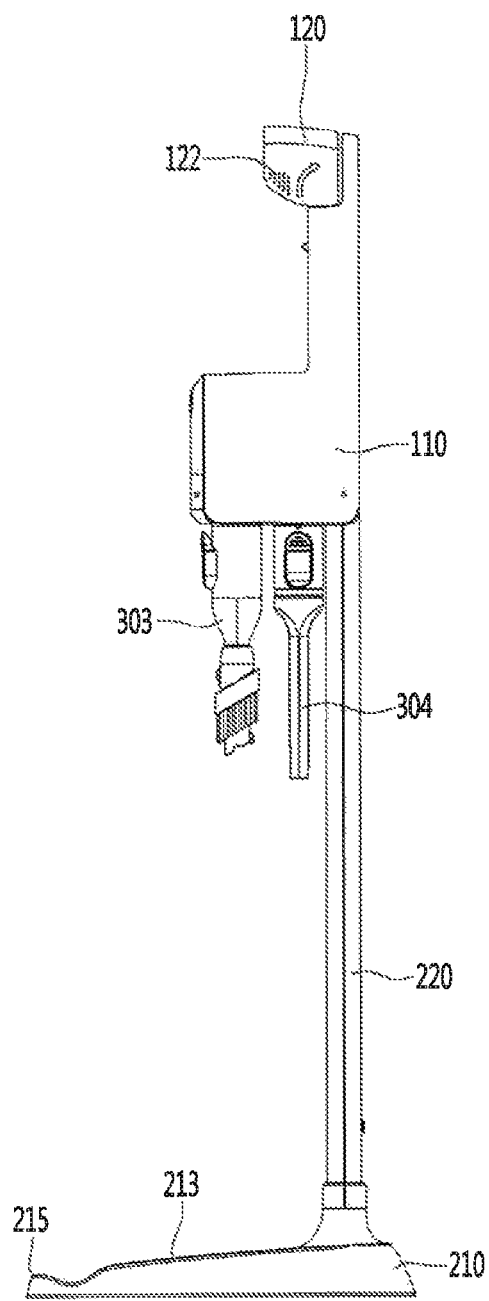
FIG. 2 is a front view of the cleaner holder of FIG. 1.
Figure 3:
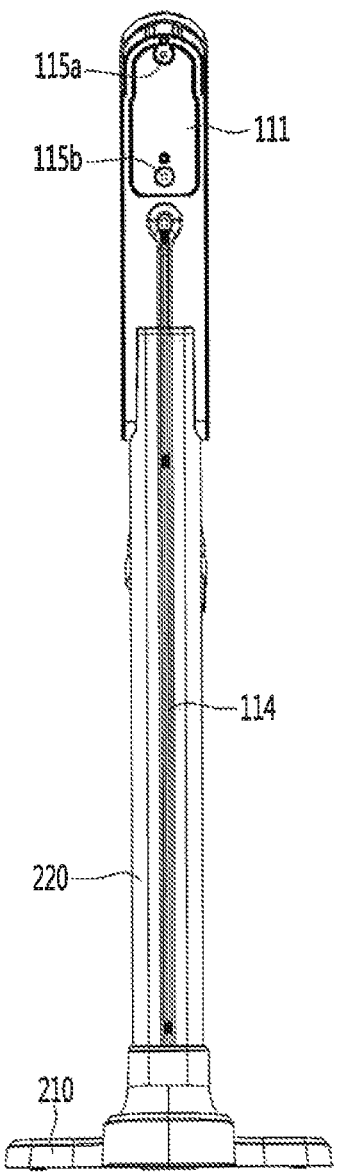
FIG. 3 is a rear view of the cleaner holder of FIG. 1.
Figure 4:
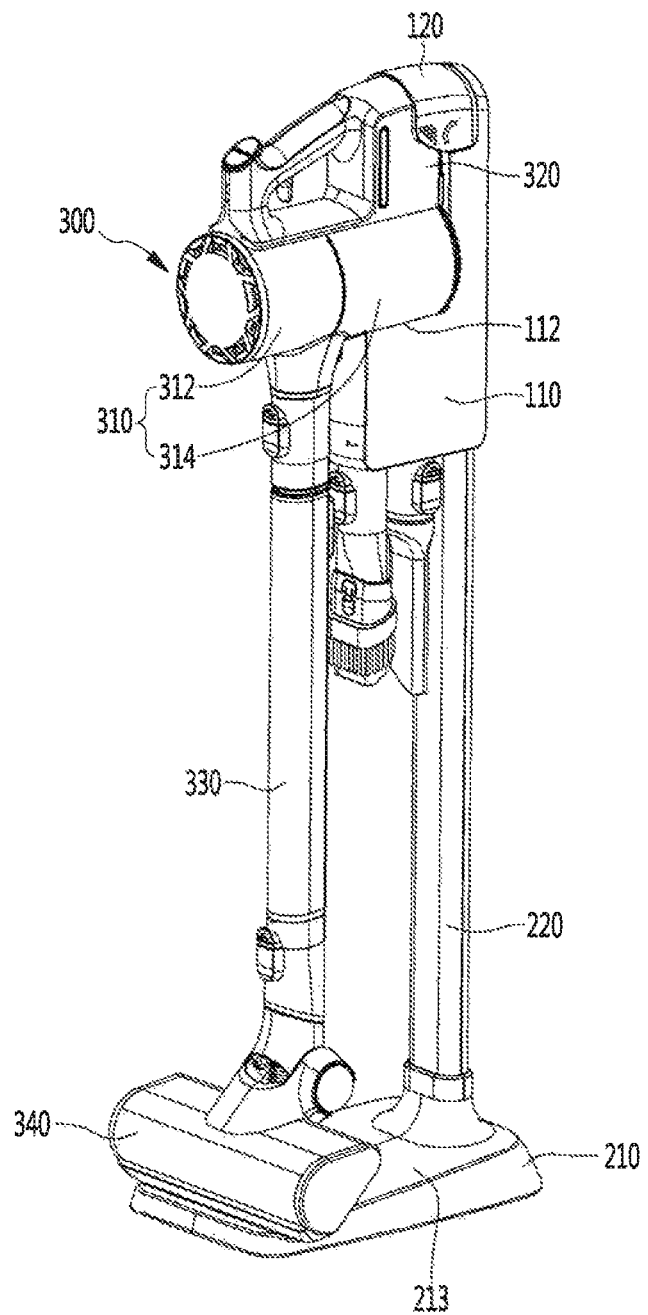
FIG. 4 is a view illustrating a state in which a cleaner is held on the cleaner holder.

FIG. 1 is a perspective view illustrating a cleaner holder according to an embodiment of the present disclosure, FIG. 2 is a front view of the cleaner holder of FIG. 1, FIG. 3 is a rear view of the cleaner holder of FIG. 1, and FIG. 4 is a view illustrating a state in which a cleaner is held on the cleaner holder.

Referring to FIGS. 1 and 4, a cleaner holder 10 according to the embodiment of the present disclosure includes a charging stand 100 for charging a battery of the cleaner 300.

The charging stand 100 may simultaneously support the cleaner 300 and charge the battery provided in the cleaner 300.

The cleaner 300 may include a cleaner body 310 having a suction motor, a battery housing 320 in which the battery is accommodated, an extension tube 330 and a suction nozzle 340. The cleaner body 310 may include a dust separator 312 for separating dust and a dust container 314 in which the dust separated by the dust separator 312 are stored. External air may be introduced by suction force generated in the cleaner body 310 through the suction nozzle 340 and the extension tube 330 and may be moved to the dust container 314 provided in the cleaner body 310. Hereinafter, detailed descriptions of the cleaner 300 will be omitted.

The charging stand 100 includes a charging stand body 110.

The charging stand body 110 includes a charging port 113. The charging port 113 may be in contact with terminals of the cleaner 300 to charge the battery provided in the cleaner 300.

An extra battery 302 may be accommodated in the charging stand body 110. Although not illustrated, the charging stand body 110 may additionally include a charging port for charging the extra battery 302.

Extra nozzles 303 and 304 may be coupled to the charging stand body 110. The nozzles 303 and 304 may be attached/detached to/from the cleaner 300 or the like. In general, a cleaner may include a plurality of replaceable suction nozzles according to usage. Thus, it is inconvenient to store the suction nozzle that is not used. However, in this way, when the suction nozzles 303 and 304 are stored while being coupled to the charging stand body 110, the risk of loss is reduced, and a user may easily use the same. The extra nozzles 303 and 304 may be named accessories.

Fixing parts 115a and 115b for fixing the charging stand 100 to a wall surface may be provided on a rear surface 111 of the charging stand body 110. Accordingly, the charging stand 110 may be fixed to the wall surface. For example, the fixing parts 115a and 115b may have a hole or groove shape. Accordingly, nails or the like, which are installed on the wall surface, are inserted into the fixing parts 115a and 115b, so that the charging stand body 110 may be fixed to the wall surface.

A support part 112 for supporting the cleaner body 310 may be provided in the charging stand body 110. The support part 112 may protrude forward. The support part 112 may support the cleaner body 310 from below.

The charging stand 100 may further include a locking part 120 provided in the charging stand body 110. The locking part 120 may be coupled to the cleaner 300 to stably fix the cleaner 300.

In detail, the locking part 120 may be coupled to the battery housing 320 to support the cleaner 300. An inner peripheral surface of the locking part 120 may have a shape corresponding to an outer peripheral surface of the battery housing 320 to surround the outer peripheral surface of the battery housing 320.

The user may selectively rotate the locking part 120 forward/rearward such that the locking part 120 may be coupled to the battery housing 320. The locking part 120 may include an anti-slide part 122 for providing friction force such that the user may easily grip the locking part 120. The anti-slide part 122 may include a plurality of bosses on an outer peripheral surface of the locking part 120.

The cleaner holder 10 may further include a stand 200 for supporting the charging stand 100.

The stand 200 may include a base 210 supported on a floor and a support 220 provided in the base 210. The support 220 may be detachably coupled to the charging stand 100.

The support 220 may extend from the base 210 in a vertical direction. In some cases, the location at which the support 220 is connected to the base 210 may be closer to a rear edge of the base 210 than to a front edge of the base 210. Additionally, the support 220 may be connected to the base 210 at a location between a center of gravity of the base 210 and the rear edge of the base 210 so that a resulting rotational momentum of the cleaner stand 100 may be decreased. In this case, a rotational momentum caused by repulsive force of the base 210 against ground may be in an opposite direction of the rotational momentum of the charging stand 100. The support 220 may be coupled to an electric wire 114 provided in the charging stand 100. The electric wire 114 may extend from the rear surface 111 of the charging stand body 110 to be connected to an external power source.

The base 210 may include an inclined surface 213 on which the suction nozzle 340 of the cleaner 300 is held and a stopper 215 for preventing the suction nozzle 340 of the cleaner 300 from being separated therefrom. In some cases, the weight of the cleaner 300 may be supported by the support part 112 as well as a portion of the base 210, such as the stopper 215. That is, the weight of the cleaner 300 may be transferred to the stand 200 via both the charging stand 100, which supports the cleaner body 310, and the base 210, which supports the suction nozzle 340. In some cases, when the cleaner 300 is coupled to the charging stand 100 and supported by the stand 200, as seen for example in FIG. 4, the highest point of the charging stand 100 may be positioned vertically higher than the highest point of the cleaner 300.

The stopper 215 may protrude from an end of the inclined surface 213. The stopper 215 serves to support the suction nozzle 340 such that a state in which the suction nozzle 340 is stably seated on the base 210 may be maintained.

Hereinafter, a method for coupling the cleaner 300 to the holder 10 will be described.

Figure 5A:
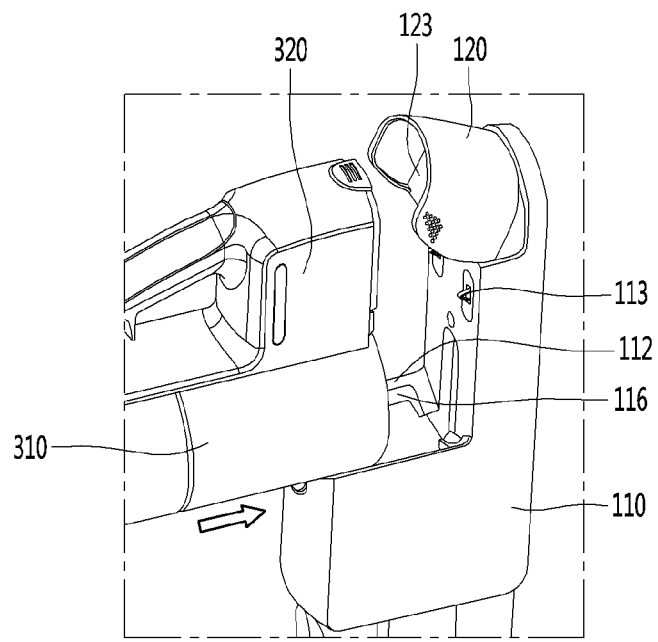
FIG. 5A is a view illustrating a state in which the cleaner is coupled to a support part.
Figure 5B:
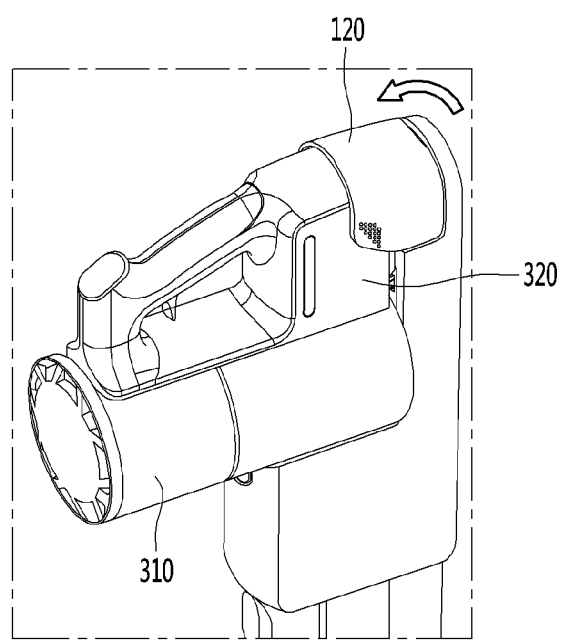
FIG. 5B is a view illustrating a state in which a locking part is coupled to the cleaner.

FIG. 5 is a view illustrating a state in which a cleaner is held on the cleaner holder. In detail, FIG. 5A illustrates a state in which the cleaner is coupled to a support part, and FIG. 5B illustrates a state in which the locking part is coupled to the cleaner.

Referring to FIG. 5, a guide 116 for guiding movement of the cleaner body 310 may be provided in the charging stand body 110.

The guide 116 may be provided inside the support part 112. Accordingly, the cleaner body 310 may be moved forward/rearward along the guide 116 while being supported by the support part 112. As illustrated, the cleaner body 310 is moved along the guide 116 to come into contact with the charging port 113. The cleaner body 310 may be inserted along various directions into the cleaner holder to be charged. For example, the cleaner body 310 may be guided in a downward direction by the cleaner holder to make appropriate contact with the charging port 113.

The locking part 120 may be rotatably connected to the charging stand body 110 within a predetermined angle. FIG. 5A illustrates a state in which the locking part 120 is maximally rotated rearward (in a clockwise direction in FIG. 5A).

The charging stand body 110 may include an elastic member (not illustrated) for applying elastic force to the locking part 120. In a state in which the locking part 120 is rotated rearward, the elastic member (not illustrated) may apply elastic force to a rear side thereof such that a state in which the locking part 120 is rotated rearward is maintained.

The locking part 120 may include a push part 123. The push part 123 may be provided inside the locking part 120. The push part 123 may be pressed by the battery housing 320 while the cleaner body 310 is moved along the guide 116.

When the push part 123 is pressed by the battery housing 320, the locking part 120 may be operated.

In detail, when the locking part 120 is operated, the locking part 120 may be rotated forward (in a counterclockwise direction in FIG. 5B) to be coupled to the outer peripheral surface of the battery housing 320. Accordingly, the locking part 120 may cover at least a portion of the battery housing 320.

When the locking part 120 is rotated forward, the elastic member (not illustrated) may apply elastic force such that a state in which the locking part 120 is rotated forward is maintained. Accordingly, the locking part 120 may serve to fix the battery housing 320 to the charging stand body 110.

FIG. 6 is a view illustrating a state in which an extra battery is separated from the cleaner holder.

Referring to FIG. 6, the charging stand body 110 may include a battery accommodating part 117a for accommodating the extra battery 302.

The battery accommodating part 117a may be recessed rearward from one surface of the charging stand body 110. Further, the battery accommodating part 117a may be provided inside the support part 112 and the guide 116.

Although not illustrated, a charging port for charging the extra battery 302 may be provided inside the battery accommodating part 117a.

The charging stand body 110 may include grooves 117b and 117c for allowing the extra battery 302 accommodated in the battery accommodating part 117a to be easily gripped.

The grooves 117b and 117c may include a first groove 117b provided in front of the battery accommodating part 117a and a second groove 117c provided on a rear side of the battery accommodating part 117a.

Figure 7:
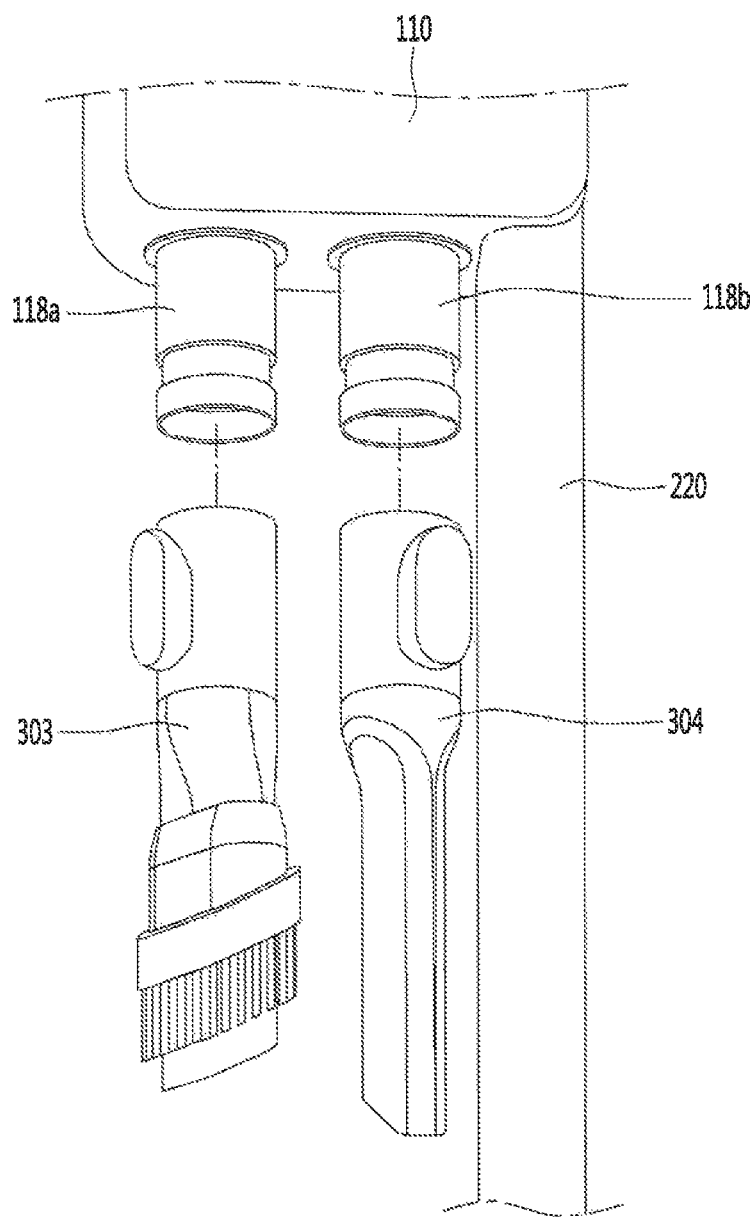
FIG. 7 is a view illustrating a state in which a nozzle is separated from a charging stand.

FIG. 7 is a view illustrating a state in which a nozzle is separated from a charging stand.

Referring to FIG. 7, the charging stand body 110 may include connectors 118a and 118b to which the extra nozzles 303 and 304 are selectively coupled. The connectors 118a and 118b may extend from one side of the charging stand body 110.

The user may attach/detach the nozzles 303 and 304 to the connectors 118a and 118b as needed. Accordingly, because the extra nozzles 303 and 304 are easily stored and used, user convenience may be improved.

Figure 8:
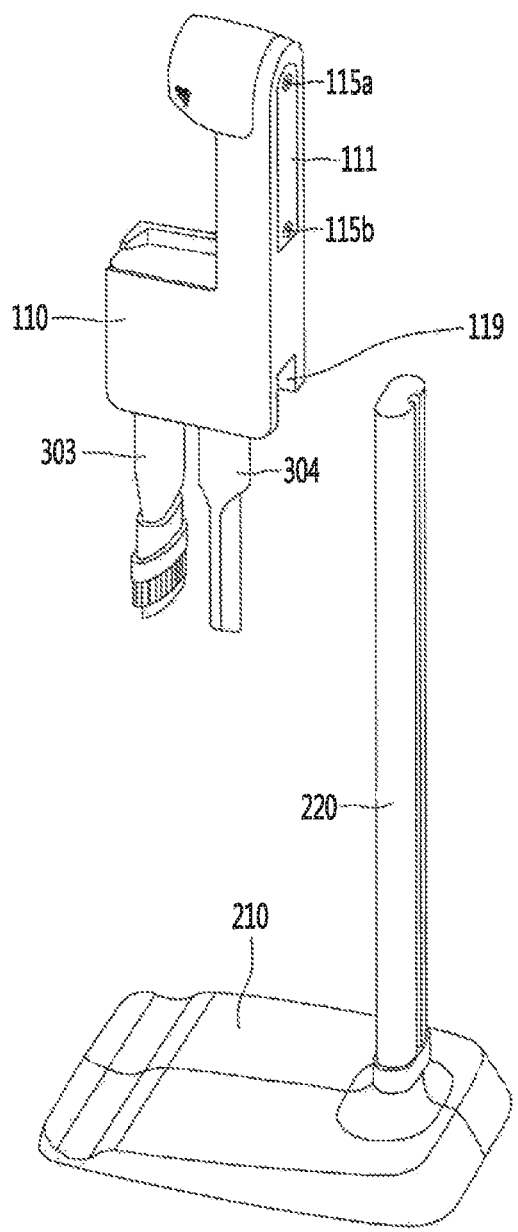
FIG. 8 is a view illustrating a state in which the charging stand is separated from the support.
Figure 9:
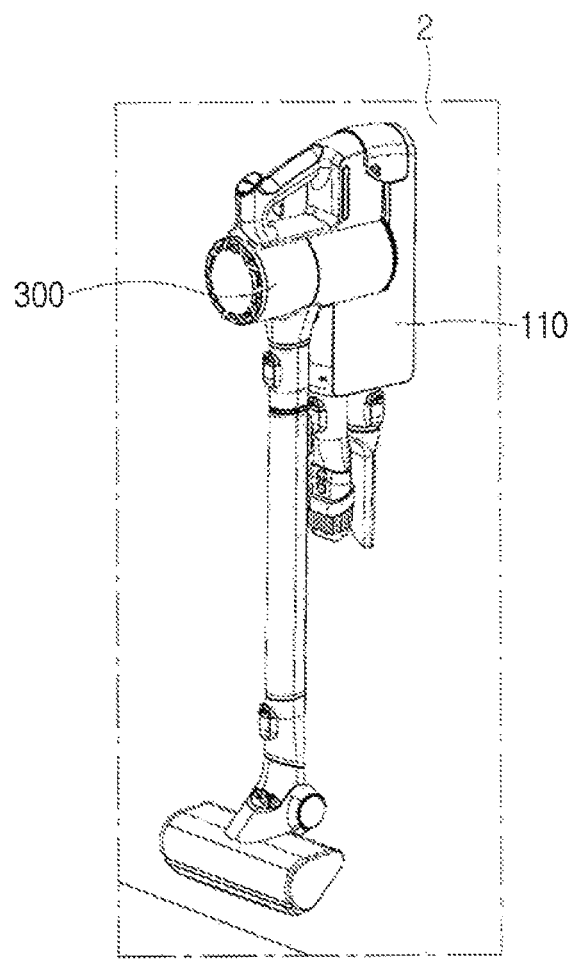
FIG. 9 is a view illustrating a state in which the charging stand on which the cleaner is held is mounted on a wall surface.

FIG. 8 is a view illustrating a state in which the charging stand is separated from the support, and FIG. 9 is a view illustrating a state in which the charging stand on which the cleaner is held is mounted on a wall surface.

Referring to FIGS. 8 and 9, the charging stand body 110 may include a coupling part 119 to which the support 220 is coupled. The support 220 may be detachably coupled to the coupling part 119. Accordingly, the user may easily separate the charging stand body 110 and the support 220 from each other.

As needed, the user may fix the charging stand body 110 from which the support 220 is separated to a wall surface 2 using the fixing parts 115a and 115b.

Figure 10:
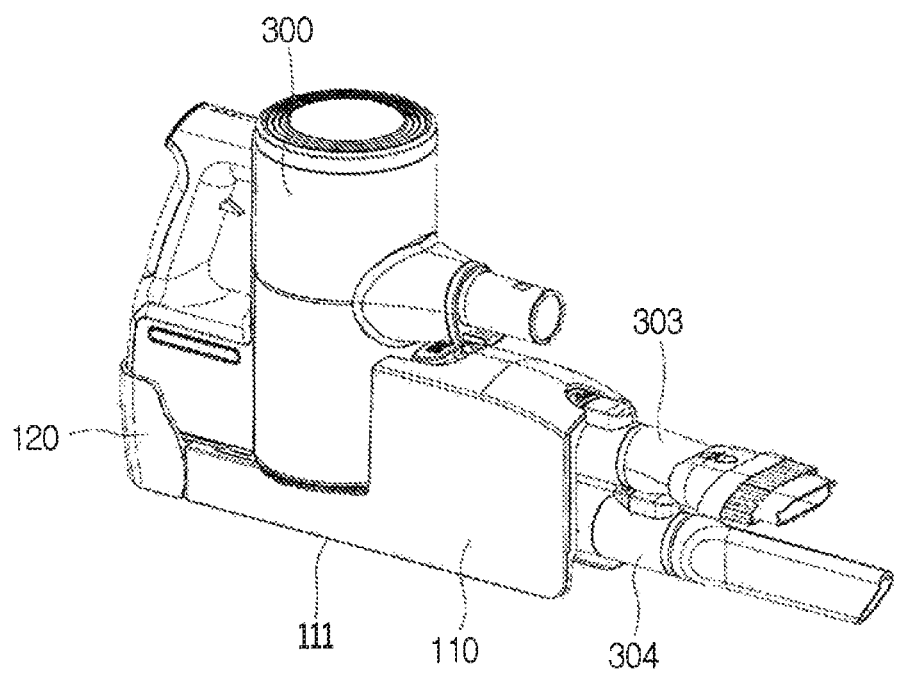
FIG. 10 is a view illustrating a state in which a charging stand body is supported by a floor.

FIG. 10 is a view illustrating a state in which the charging stand body is supported by the floor.

Referring to FIG. 10, the rear surface 111 of the charging stand body 110 may be supported by the floor. To achieve this, the rear surface 111 of the charging stand body 110 may have a planar shape. In this way, because the charging stand body 110 may be held in various schemes according to a usage situation, user convenience may be improved.

Hereinafter, a cleaner holder according to another embodiment of the present disclosure will be described in detail.

Figure 11:
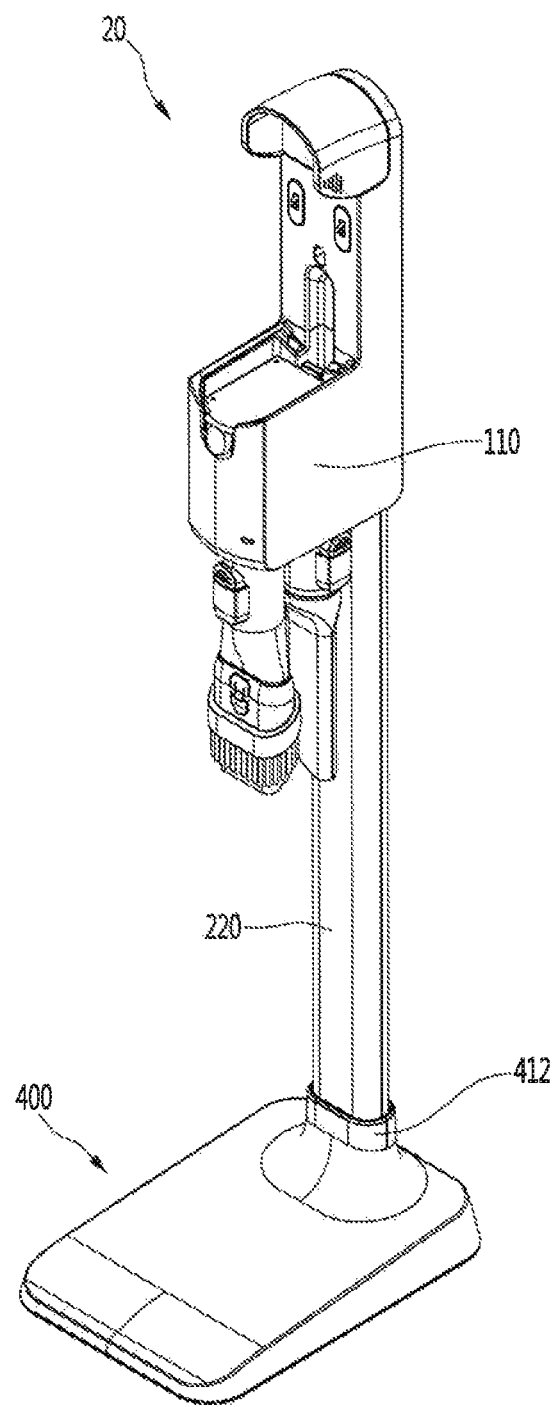
FIG. 11 is a perspective view illustrating a cleaner holder according to another embodiment of the present disclosure.

FIG. 11 is a perspective view illustrating a cleaner holder according to another embodiment of the present disclosure.

Referring to FIG. 11, the cleaner holder 20 according to another embodiment of the present disclosure includes a charging stand body 110 for charging a cleaner, a support 220 connected to the charging stand body 110 to support the charging stand body 110, and a base 400 supported by the floor and coupled to a lower portion of the support 220.

The base 400 may include a first neck 412 into which the support 220 is inserted. The first neck 412 may be formed to surround the support 220. In detail, an upper end of the first neck 412 is curved inward to surround an outer peripheral surface of a lower end of the support 220.

When compared with the cleaner holder 10, the cleaner holder 20 according to the present embodiment has a different configuration of the base 400 and substantially the same configurations of other components. Thus, the base 400 will be mainly described below.

Figure 12:
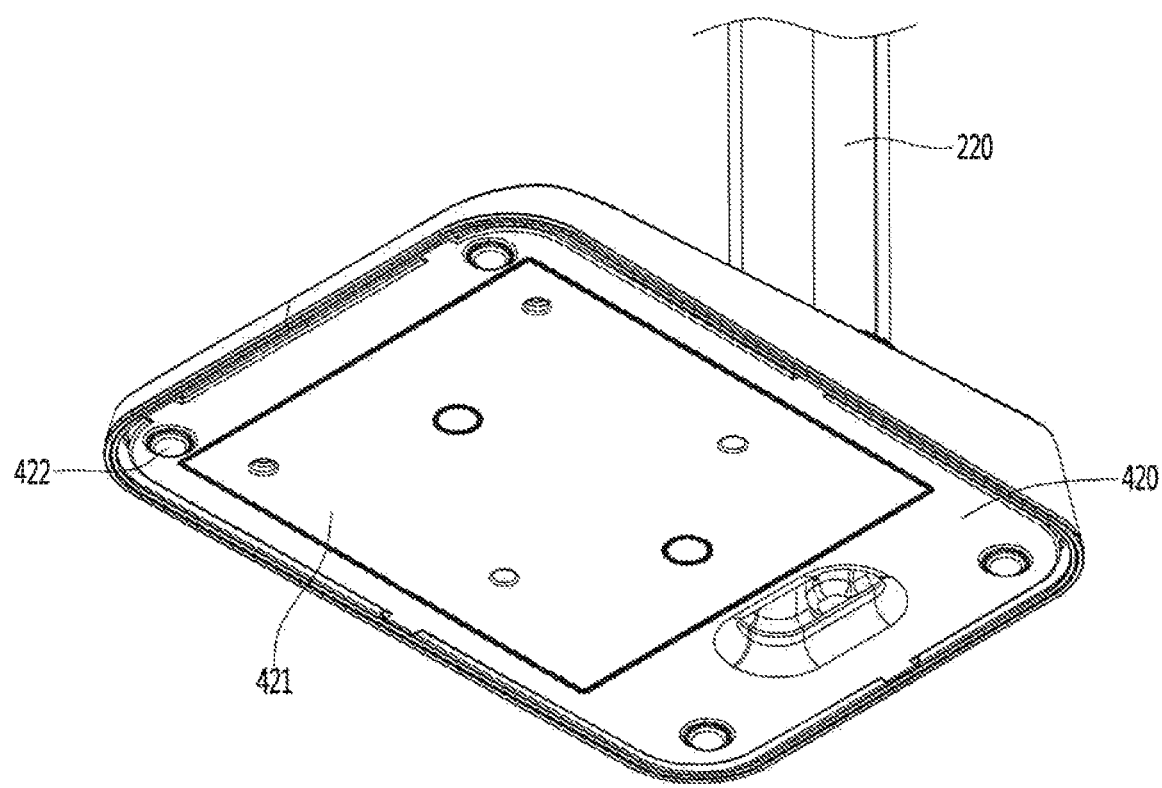
FIG. 12 is a bottom view of a base of FIG. 11.
Figure 13:
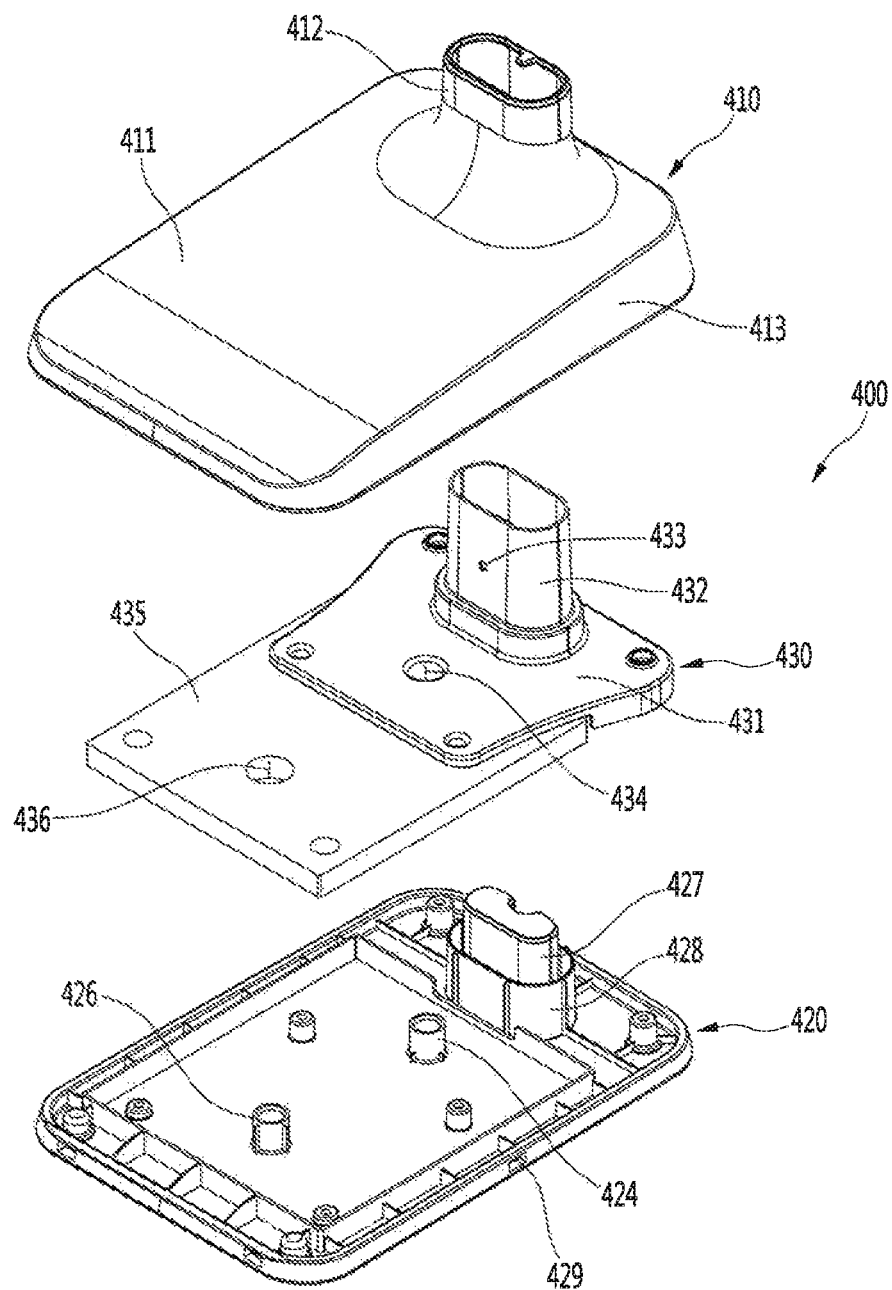
FIG. 13 is an exploded perspective view illustrating the base of FIG. 11.
Figure 14:
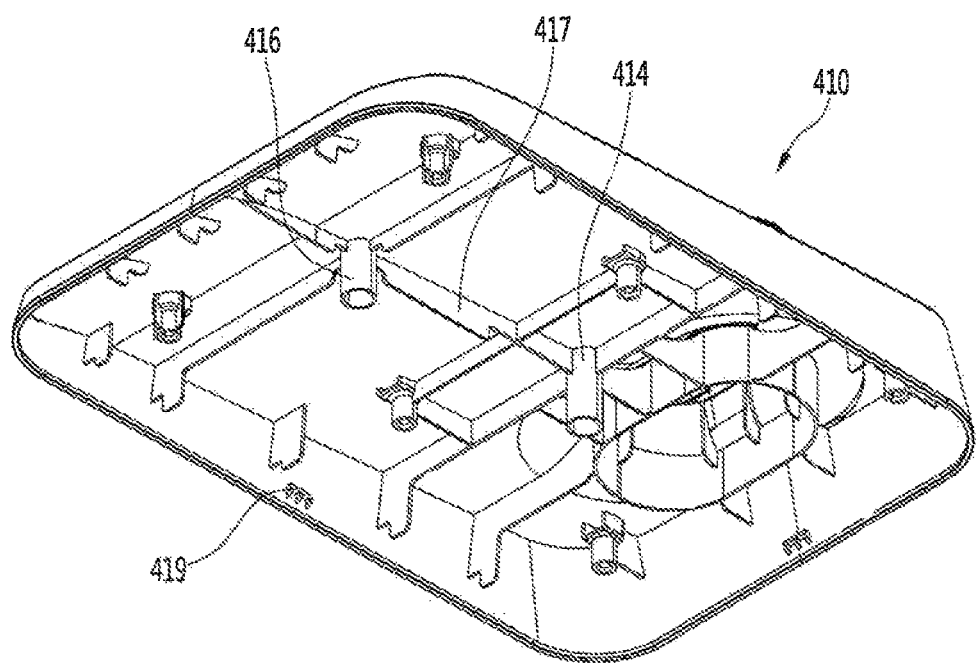
FIG. 14 is a bottom view of an upper cover of FIG. 12.

FIG. 12 is a bottom view of the base of FIG. 11, FIG. 13 is an exploded perspective view illustrating the base of FIG. 11, and FIG. 14 is a bottom view of an upper cover of FIG. 12.

Referring to FIGS. 12 to 14, the base 400 includes an upper cover 410, a lower cover 420 and an inner base 430. The lower cover 420 is provided below the upper cover 410 and the inner base 430 is provided between the upper cover 410 and the lower cover 420.

The upper cover 410 may include an upper surface 411 and a side surface 413. The upper surface 411 may define an upper surface of the base 400, and the side surface 413 may extend downward from an edge of the upper surface 411.

The upper surface 411 may be inclined downward as it goes forward from a side of the support 220. A suction nozzle 340 of a cleaner 300 supported by the charging stand body 110 may be in contact with the upper surface 411.

The first neck 412 may be provided on the upper surface 411 of the upper cover 410. The first neck 412 may protrude upward from the upper surface 411. An upper end of the first neck 412 may be formed to surround an outer peripheral surface of the support 220.

The inner base 430 is arranged below the upper cover 410. A contact rib 417 in contact with the inner base 430 may be provided below the upper cover 410. The contact rib 417 functions to maintain a distance between the upper cover 410 and the inner base 430 constantly as the contact rib 417 comes into contact with an upper surface of the inner base 430.

A bottom surface 421 of the lower cover 420 is supported by the floor and is coupled to the upper cover 410 on an upper side thereof.

A friction part 422 for maintaining predetermined friction force between the bottom surface 421 and the floor may be provided on the bottom surface 421 of the lower cover 420. The friction part 422 may include a rubber gasket or spike. When the floor is formed of a smooth material such as wood, marble and a tile, the rubber gasket may be used as the friction part 422. Further, when the cleaner holder 20 is used on a carpet, the spike may be used as the friction part 422.

The inner base 430 may include a body 431. The body 431 may be interposed between the upper cover 410 and the lower cover 420 and may be coupled to the upper cover 410 and the lower cover 420.

The body 431 may be formed of aluminum and may be manufactured in a die casting scheme. Thus, a plurality of bodies 431 may be manufactured to have the same shape.

The inner base 430 may include a second neck 432 provided in the body 431 and coupled to the support 220. The second neck 432 may extend upward from the body 431 and may surround at least a portion of a lower end of the support 220.

Meanwhile, the second neck 432 may be in surface contact with the support 220. Accordingly, an impulse transferred from the second neck 432 to the support 220 is dispersed, so that damage of the support 220 caused by friction between the support 220 and the second neck 432 may be minimized.

As the length of the second neck 432 is increased, a contact area between the second neck 432 and an outer peripheral surface of the support 220 is increased. Thus, as the length of the second neck 432 is increased within a predetermined range, stability of the support 220 may be improved. Thus, the second neck 432 may be manufactured to a minimum length for stable support of the support 220 or more.

Further, a coupling part 433 for coupling with the support 220 may be formed in the second neck 432. The coupling part 433 may include a hole.

The inner base 430 may further include an auxiliary base 435 coupled to the body 431. The auxiliary base 435 may be coupled to a front side of the body 431.

The auxiliary base 435 may be formed of a material having a larger density than other components of the cleaner holder 20, and the center of gravity of the inner base 430 may be formed on a side of the auxiliary base 435. For example, the auxiliary base 435 may be formed of metal, and the support, the body, the charging stand body, the upper cover and the lower cover may be formed of plastic.

Furthermore, the center of gravity of the base 400 may be located, by the auxiliary base 435, on a front side of a line by which the front-rear length of the base 400 is bisected. Thus, the cleaner 300 coupled to an upper side of the cleaner holder 20 may be stably supported. Because the cleaner 300 is coupled to an upper portion of the cleaner holder 20 as illustrated in FIG. 4, the center of gravity of a coupled body of the cleaner holder 20 and the cleaner 300 (may include an extra battery) is biased to an upper side and a front side, and thus, stability may deteriorate. However, the center of gravity of the coupled body of the cleaner holder 20 and the cleaner 300 may be adjacent to the floor due to the auxiliary base 435, so that stability of the coupled body of the cleaner holder 20 and the cleaner 300 may be improved.

A coupling boss (see FIG. 15) inserted into the auxiliary base 435 may be provided in the body 431. The body 431 may be coupled to the auxiliary base 435 by the coupling boss 437. Unlike the drawings, the body 431 and the auxiliary base 435 may be integrally manufactured.

A plurality of coupling holes 434 and 436 for coupling with the upper cover 410 and the lower cover 420 may be formed in the auxiliary base 430. The plurality of coupling holes 434 and 436 may be formed in the body 431 or the auxiliary base 435.

The plurality of coupling holes 434 and 436 may include a first coupling hole 434 formed in the body 431 and a second coupling hole 436 formed in the auxiliary base 435. The first coupling hole 434 and the second coupling hole 436 may be plural as illustrated. For convenience of description, in the present specification, the description will be made assuming that the number of the first coupling hole 434 and the number of the second coupling hole 436 is one.

The lower cover 420 may further include a third neck 427 for coupling with the support 220. The third neck 427 may extend upward from the lower cover 420 and may be coupled to the support 220. A portion of the bottom surface of the lower cover 420, which overlaps a vertical lower side of the second neck 427, may be recessed upward.

The lower cover 420 may further include a support rib 428 supporting the inner base 430. The support rib 428 may be spaced apart from the third neck 427 by a predetermined interval and may have a shape surrounding the third neck 427. Further, an upper end of the support rib 428 may be lower than an upper end of the third neck 427.

Fastening holes 429 for coupling with the upper cover 410 may be formed in the lower cover 420. The fastening holes 429 may be formed on side surfaces of the lower cover 420. Fastening bosses 419 inserted into the fastening holes 429 may be provided in the upper cover 410.

The lower cover 420 may further include a plurality of lower coupling members 424 and 426 for coupling with the inner base 430. The plurality of lower coupling members 424 and 426 may be inserted into the first coupling hole 434 and the second coupling hole 436 provided in the inner base 430, respectively. As illustrated, although the first coupling hole 434 and the second coupling hole 436 may be arranged in one line, the present disclosure is not limited thereto.

The upper cover 410 may further include a plurality of upper coupling members 414 and 416 for coupling with the Inner base 430. The plurality of upper coupling members 424 and 426 may be inserted into the first coupling hole 434 and the second coupling hole 436 provided in the inner base 430, respectively.

Hereinafter, a coupling relationship between the upper cover 410, the lower cover 420 and the inner base 430 will be described in detail.

Figure 15:
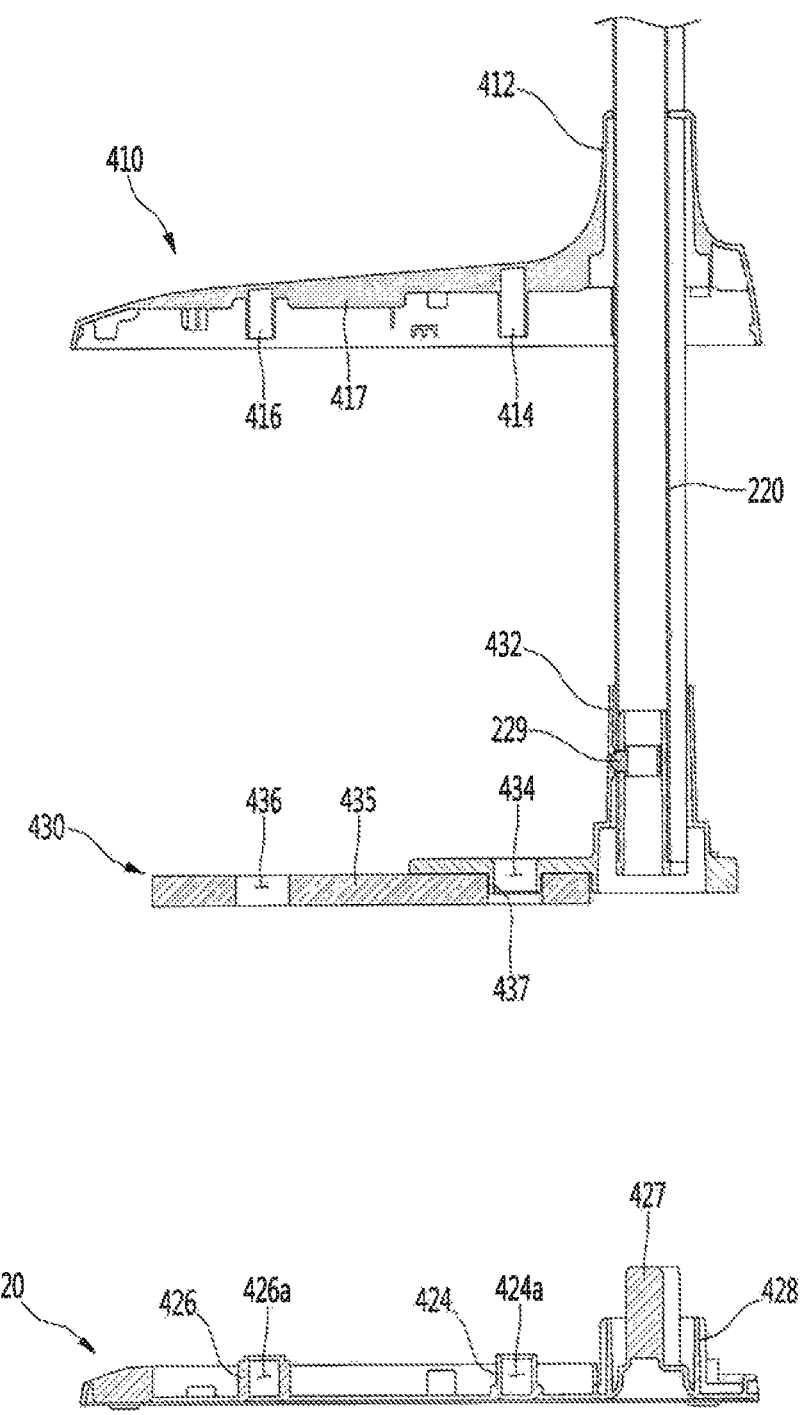
FIG. 15 is an exploded sectional view illustrating an inner base of FIG. 15.
Figure 16:
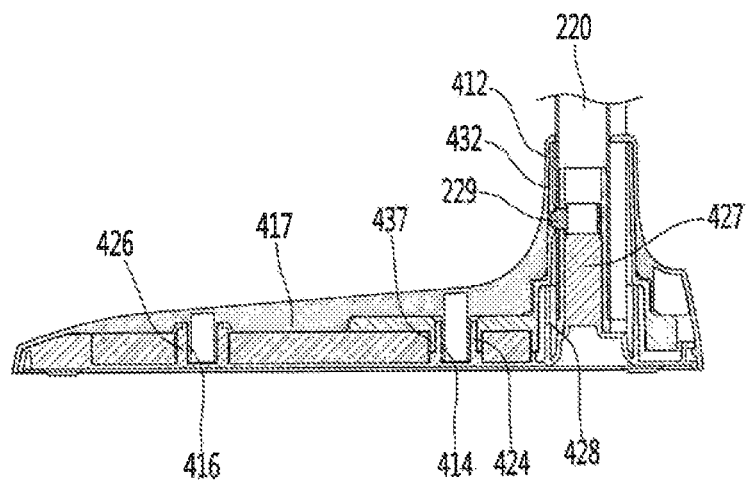
FIG. 16 is a sectional view illustrating the inner base.

FIG. 15 is an exploded sectional view illustrating the inner base, and FIG. 16 is a sectional view illustrating the inner base.

Referring to FIGS. 15 and 16, a fastening unit 229 for coupling with the inner base 430 may be provided in the support 220. The fastening unit 229 may be inserted into the support 220 through an opening formed at a lower end of the support 220. The fastening unit 229 may include a boss inserted in the coupling part 433 (see FIG. 13) provided in the second neck 432. The elastic member provided inside the support 220 is connected to the boss of the fastening unit 229 so that the support 220 may be elastically supported. Accordingly, the boss may be selectively inserted/withdrawn into/from an inside of the support 220. Meanwhile, the fastening unit 229 may be coupled to the third neck 427 not to the support 220.

An opening inserted into the third neck 427 may be formed at a lower end of the support 220. When the third neck 427 is inserted into the opening of the support 220, an outer peripheral surface of the third neck 427 may come into contact with an inner peripheral surface of the opening of the support 220. Accordingly, the lower cover 420 may be coupled to the support 220 to support the support 220.

The support rib 428 may come into contact with the bottom surface of the inner base 430 to support the inner base 430. Further, the support rib 428 may be provided on a vertical lower side of the second neck 432. Accordingly, the support rib 428 may support loads transferred through the second neck 432.

The plurality of upper coupling members 414 and 416 may include a first upper coupling member 414 and a second upper coupling member 416. The plurality of lower coupling members 424 and 416 may include a first lower coupling member 424 and a second lower coupling member 426.

Both the first upper coupling member 414 and the first lower coupling member 424 may be inserted into the first coupling hole 434. Further, the second upper coupling member 416 and the second lower coupling member 426 may be inserted into the second coupling hole 436. Accordingly, the upper cover 410, the lower cover 420 and the inner base 430 may be firmly coupled to each other.

An outer peripheral surface of the first lower coupling member 424 may come into close contact with an inner peripheral surface of the first coupling hole 434. Accordingly, the first lower coupling member 424 may be fixed to the first coupling hole 434.

A first insertion groove 424a into which the first upper coupling member 414 is inserted may be formed in the first lower coupling member 424. An outer peripheral surface of the first upper coupling member 414 may contact or come into close contact with an inner peripheral surface of the first insertion groove 424a on at least a portion thereof. The first upper coupling member 414 is inserted into the first insertion groove 424a to be coupled to the first lower coupling member 424.

An outer peripheral surface of the second lower coupling member 426 may come into close contact with an inner peripheral surface of the second coupling hole 436. Accordingly, the second lower coupling member 426 may be fixed to the second coupling hole 436.

A second insertion groove 426a into which the second upper coupling member 416 is inserted may be formed in the second lower coupling member 426. An outer peripheral surface of the second upper coupling member 416 may contact or come into close contact with an inner peripheral surface of the second insertion groove 426a on at least a portion thereof. The second upper coupling member 416 is inserted into the second insertion groove 426a to be coupled to the second lower coupling member 426. Torsion of the inner base 430 may be prevented according to such a mechanical fastening scheme.

In this way, due to a multi-support structure in which the outer peripheral surface of the support 220 is supported by the first neck 412 and the second neck 423 and the inner peripheral surface of the support 220 is supported by the third neck 427, stability of the support 220 may be improved and a connection part of the support 220 and the base 400 may be prevented from being damaged. Accordingly, the cleaner holder 20 may stably hold the cleaner 300.

What is claimed is:

1. A cleaner holder comprising:
a charging stand body that includes at least one charging port configured to charge a battery of a cleaner;
a base configured to rest on ground; and
a support that connects the charging stand body to the base,
wherein the base comprises:
an inner base surrounding at least a portion of the support,
an upper cover coupled to an upper side of the inner base and configured to support an outer peripheral surface of the support, and
a lower cover coupled to a lower side of the inner base and configured to support an inner peripheral surface of the support,
wherein the lower cover comprises a lower neck inserted into a lower end of the support, the lower neck contacting at least a portion of the inner peripheral surface of the support.

2. The cleaner holder of claim 1, wherein the upper cover comprises a first neck extending upward and surrounding at least a portion of the support.

3. The cleaner holder of claim 2, wherein the inner base comprises a second neck configured to be inserted into the first neck, the second neck surrounding at least a portion of the support.

4. The cleaner holder of claim 3, wherein an inner peripheral surface of the second neck contacts at least a portion of the outer peripheral surface of the support.

5. The cleaner holder of claim 3, wherein the support includes a fastening unit configured to couple the support to the second neck of the inner base.

6. The cleaner holder of claim 5, wherein the fastening unit comprises a boss and an elastic member that supports the boss, the boss being configured to be selectively inserted into and withdrawn from an inside of the support, and
wherein the second neck includes a coupling part configured to receive the boss.

7. The cleaner holder of claim 1, wherein the lower cover includes a recess that is recessed upward from a bottom surface of the lower cover, the recess being located under the lower neck.

8. The cleaner holder of claim 1, wherein the lower cover further includes a support rib that surrounds the lower neck and is configured to support a bottom surface of the inner base.

9. The cleaner holder of claim 1, wherein the inner base defines a coupling hole that receives an upper coupling member of the upper cover and a lower coupling member of the lower cover.

10. The cleaner holder of claim 9, wherein the lower coupling member includes an insertion groove into which the upper coupling member is inserted, and
wherein at least a portion of an outer peripheral surface of the upper coupling member contacts an inner peripheral surface of the insertion groove.

11. The cleaner holder of claim 9, wherein the inner base comprises:
a body coupled to the support; and
an auxiliary base coupled to a front portion of the body.

12. The cleaner holder of claim 11, wherein the auxiliary base is made of a metal material and the body is made of a plastic material that is lighter the metal material such that a center of gravity of the inner base is closer to the auxiliary base than to the body.

13. The cleaner holder of claim 11, wherein the body include a coupling boss configured to be inserted into the auxiliary base.

14. The cleaner holder of claim 13, wherein the coupling hole is positioned in the coupling boss.

15. The cleaner holder of claim 11, wherein the coupling hole is positioned in the auxiliary base.

16. The cleaner holder of claim 1, wherein the lower cover includes a friction part on a bottom surface of the lower cover, the friction part being configured to provide friction between the bottom surface of the lower cover and ground.

17. The cleaner holder of claim 16, wherein the friction part includes a rubber gasket or a spike.

18. The cleaner holder of claim 1, wherein the upper cover includes a contact rib that protrudes downward from a bottom surface of the upper cover, the contact rib being contacting an upper surface of the inner base.

19. The cleaner holder of claim 1, wherein the upper cover includes fastening bosses configured to be coupled to fastening holes defined in the lower cover.

20. The cleaner holder of claim 1, wherein the charging stand body includes a battery accommodating part configured to receive a cleaner battery that has been detached from the cleaner, and an additional charging port is located in the battery accommodating part.

21. A cleaner holder comprising:
   a charging stand body comprising a support part that protrudes forward and that is configured to receive a portion of a cleaner;
   a charging port located at a front surface of the charging stand body and configured to charge a battery of the cleaner;
   a support extending vertically downward from and being connected to the charging stand body; and
   a base located vertically below the support and connected to the support, the base having a front edge and a rear edge,
   wherein the support is connected to the base at a location that is closer to the rear edge of the base than to the front edge of the base, and
   wherein the support is connected to the charging stand body at a location that is closer to a rear surface of the charging stand body than to the support part of the charging stand body.

22. The cleaner holder of claim 21, wherein the location at which the support is connected to the base is between a center of gravity of the base and the rear edge of the base.

23. The cleaner holder of claim 21, wherein the support part of the charging stand body protrudes forward of a front end of the support.

* * * * *